May 15, 1962  G. B. LAGERSTROM  3,034,913
PROCESS FOR THE PREPARATION OF SILICEOUS PIGMENT
Filed May 5, 1959
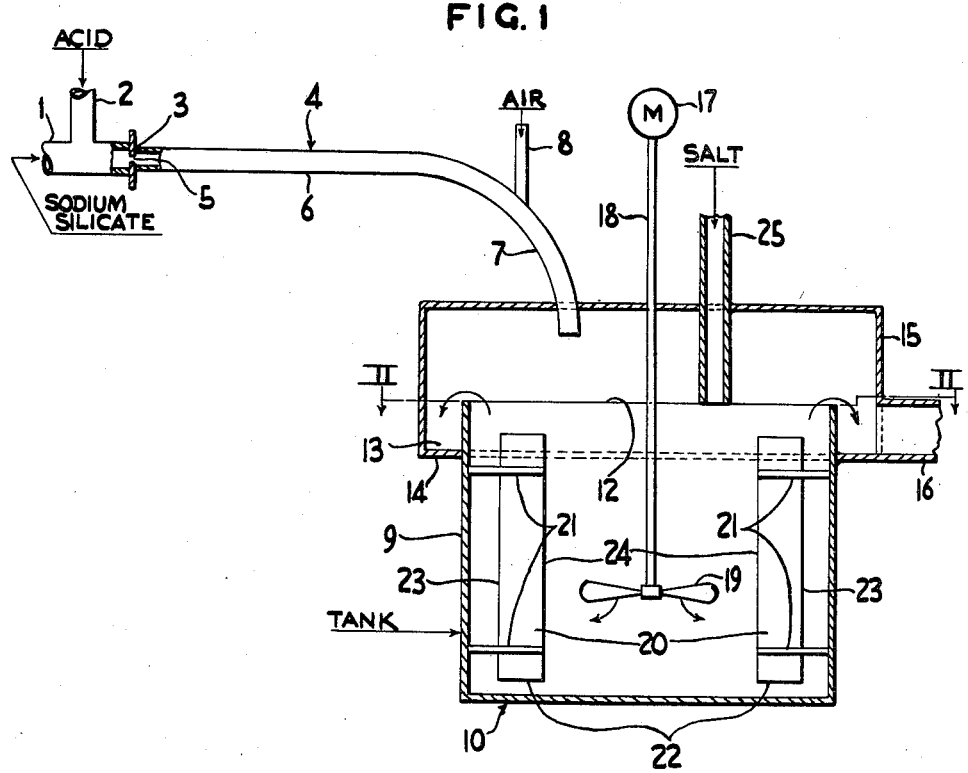
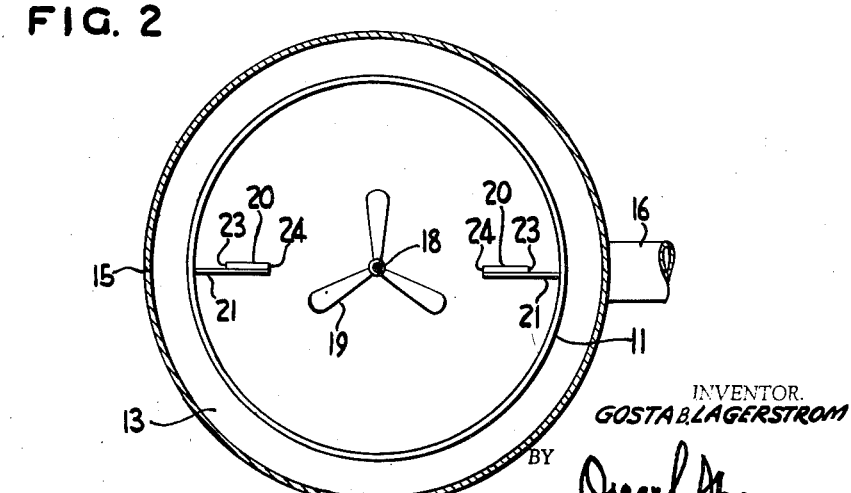
INVENTOR.
GOSTA B. LAGERSTROM
BY Oscar L. Spencer
ATTORNEY United States Patent Office 3,034,913
Patented May 15, 1962

3,034,913
PROCESS FOR THE PREPARATION OF
SILICEOUS PIGMENT
Gosta B. Lagerstrom, Barberton, Ohio, assignor, by mesne
assignments, to Pittsburgh Plate Glass Company
Filed May 5, 1959, Ser. No. 811,183
13 Claims. (Cl. 106—306)

This invention deals with precipitated finely divided siliceous pigments. It more particularly relates to the preparation of siliceous pigments admirably effective in enhancing optical properties of paper.

Incorporation of materials in paper to improve various properties has long been recognized. Varying degrees of success have been achieved. Titanium dioxide is one material that is effective in improving the optical properties, e.g., opacity and brightness, of paper. Its relatively high cost, however, limits the use of titanium dioxide to the more expensive papers. Less expensive materials such as diatomaceous earths and natural clays, on the other hand, do not significantly improve optical properties of paper in which they are dispersed.

Many of the commercial papers especially those derived from the less dear pulp sources including newsprint suffer from poor optical properties. Enhancement in an economically feasible manner of the optical properties of such papers is most desirable. Not only would this improve these papers for their present uses, but it would extend their usefulness to still further applications.

An inexpensive effective paper pigment is accordingly in demand. Its availability would make possible enhancement of the optical properties of papers derived from the cheaper pulps. It would also offer the possibility of reducing pigment costs by replacing costly titanium dioxide.

By virtue of this invention, finely divided siliceous pigments are provided which are especially suited for dispersion in paper. They are of notable effectiveness in enhancing optical properties in paper. Properly dispersed in paper, they are responsible for improving optical properties such as opacity and brightness. Their effectiveness for such purposes is considerably greater than realized with clays and diatomaceous earths.

Moreover, as will become hereinafter more apparent, these pigments are prepared from inexpensive, readily available raw materials and their preparation is not unduly costly. Thus, the cost of providing these exemplary pigments is relatively small.

These exemplary siliceous paper pigments are finely divided, precipitated, essentially amorphous materials characterized, among other things, by the relationship of their ultimate particle size and the state and nature of their flocculation. They have the major weight proportion (e.g., at least 50 weight percent), preferably at least about 75 percent, of their ultimate particles in the range of 0.08 to 0.16 micron. Moreover, the ultimate particles are agglomerated or flocculated such that at least about 85 or 90 percent (ideally 95 or 100 percent) by weight of the pigment is in the form of flocs less than 7 microns, the preponderant weight proportion (e.g., at least 50 weight percent) and preferably at least 70 weight percent, of such flocs being between 0.5 and 7 microns, preferably 0.5 to 2 microns. In the main, the flocs of these pigments are porous with pore sizes approximating the sizes of the ultimate particles forming the flocs.

Under the electron microscope, these flocs may be likened to grape clusters in which the individual grape represents the ultimate particle and the floc (or agglomerate) is denoted by the grape cluster. A substantial portion of the flocs are formed from ultimate particles so firmly bonded together that they resist to a considerable degree degradation to ultimate particles even under mechanical grinding as by micropulverization. The strength of these flocs is such that the principal flocculent characteristic of the pigment persists (is not interrupted by degradation) during the normal treatment of a paper pulp according to common practices of the paper industry. Hence, these siliceous pigments find themselves dispersed in the paper in their principal flocculated condition.

The characterizing flocs of these pigments are not to be confused with pellets or macroscopic aggregates formed from a plurality of the flocs, as for example, during the drying of wet pigments with tumbling. Such pellets are very loose packings of flocs which degrade into their constituent flocs when dispersed in water or subjected to simple mechanical grinding. They will even disintegrate under the rubbing action of human fingers. These pellets appear to be formed by compression encountered during tumbling. On the other hand, the ultimate particles forming the floc are bound together in a different manner during the precipitation of the siliceous pigment.

Undoubtedly, the relationship between the ultimate particle size and floc size contribute heavily to this strength of the flocs. Thus, flocs ranging from 0.5 to 7 microns and formed from ultimate particles 0.08 to 0.16 micron in diameter are exceptionally strong in their resistance to degradation.

Two types of water are present in these pigments. They contain "free water" which refers to that water which is removed from the pigment by heating at 105° C. for 24 hours in a laboratory oven. They also contain "bound water" which refers to that water which is removed by heating at ignition temperatures, 1000° C. to 1200° C., for an extended period, e.g., 24 hours, less "free water." Apparently, the bound water is chemically associated with the composition. Usually, the free water content ranges from about 2 to 10 percent by weight of the composition while bound water constitutes between about 2 and 10 weight percent of the composition.

As precipitated, especially according to the process herein illustrated, these siliceous pigments are comprised chemically of $SiO_2$ and one or more metal oxides including usually an alkaline earth metal oxide such as calcium oxide. Whether the $SiO_2$ and metal oxide or oxides are present as an intimate mixture of silica and alkaline earth metal oxide or an alkaline earth metal oxide having a high mole ratio of $SiO_2$ to oxide is not entirely understood. Most of the alkaline earth metal oxide-$SiO_2$ products can be chemically represented, anhydrous basis, as $MO(SiO_2)_x$ wherein M is a metal and $x$ is a value from 5 to 25 or even higher, including fractional values, and is preferably 5 to 15.

Thus, many of the pigments contain a substantial alkaline earth metal content. Best paper pigments contain calcium probably as calcium oxide. On a dry basis (normal amount of free and bound water present), the concentration of calcium on a calcium oxide basis is from about 3 to 15, more often 5 to 10, weight percent of the composition.

One or more other metals are also often present, although usually only in concentrations from 0.1 up to about 6 weight percent (as measured as their oxides) of the dry composition. Iron, aluminum, sodium and the like are typical of such metals.

Aqueous slurries of the siliceous pigments ideally effective for use in paper to enhance optical properties have an alkaline pH usually of about 8 to 10, preferably about 8.5 to 9.5.

In accordance with this invention, valuable siliceous pigments including these ideal siliceous paper pigments are prepared by neutralizing partially alkali metal silicate to provide a siliceous solution having a tendency to precipitate siliceous material and before the solution manifests this tendency, mixing therewith a salt within a limited but finite time to precipitate pigment. Thus, an aqueous sodium silicate solution or like alkali metal silicate solution and acid such as hydrochloric acid are mixed to form a siliceous solution from which siliceous precipitate would normally form, but without forming any substantial amount of precipitate, and preferably avoiding any precipitation. The resulting unstable solution is mixed promptly with sufficient salt such as calcium chloride to precipitate siliceous pigment from the resulting mixture.

For the preparation of the most effective paper pigments, the degree of neutralization of the partially neutralized alkali metal silicate solution is especially important, along with other considerations. An alkali metal silicate having between about 3.0 and 3.6 moles of $SiO_2$ per mole of alkali metal oxide should, for this purpose, be partially neutralized using between about 0.3 and about 0.7, preferably 0.4 to 0.6, equivalent of acid per equivalent of alkali metal oxide of the silicate. Care is exercised to prevent precipitation of siliceous material derived from the silicate, for example, by rapidly mixing the acid and silicate to form a homogeneous medium.

The solution resulting from such partial neutralization is highly unstable, exhibiting a tendency to form rapidly siliceous precipitate. Often within minutes, precipitate will form. Mixing with the salt is ideally accomplished before there is any such precipitation, certainly before any consequential amount of precipitate is present. Thus, sufficient salt to cause precipitation is present subsequent to but promptly after formation of the partially neutralized alkali metal silicate solution.

This prompt salt addition is best accomplished by adding the calcium chloride (or like salt) to the partially neutralized solution of sodium silicate within less than about one minute after adding the acid to the sodium silicate and forming the solution. If greater periods of time elapse, there is substantial risk of premature undesirable precipitation or formation of solid siliceous material, or formation of considerable undesirable high molecular weight silicic acid.

The maximum permissible period of time which may elapse between formation of the partially neutralized sodium silicate solution and addition of salt for the purpose of realizing siliceous precipitates of optimum value as paper pigments is interrelated with the degree of acidification, the temperature of the acidified sodium silicate solution and the $SiO_2$ concentration. Under most practical operating conditions, e.g., temperatures capable of practical attainment under commercial consideration and $SiO_2$ concentrations which are not so dilute as to make processing the pigment during recovery economically unfeasible, the maximum period of time is less than one minute and frequently is less than 5 seconds, notably less than about 0.5 second.

The lower the temperature of the acidified solution the greater leeway or lapse there may be between acidification and salt addition. Also the more dilute the partially neutralized sodium solution is the greater the maximum time between mixing with acid and addition of salt.

At temperatures substantially above 55° C., even with extremely dilute but practical concentrations of $SiO_2$, the permissible period of time separating the mixing with acid from salt addition may become quite short, even impractical. Temperatures of 0° C. to 55° C. are thus most expedient.

Moreover, the $SiO_2$ concentration of the partially neutralized sodium silicate solution is of significance. The higher the $SiO_2$ concentration the more rapidly after mixing with acid does the resulting solution precipitate undesirable solid or silicate material. Lower $SiO_2$ concentrations with the temperatures in the higher portion of the described range are thus advisable. With temperatures of 55° C. or above, best results accrue by forming more dilute partially neutralized aqueous sodium silicate solutions, e.g., solutions containing less than 15 grams per liter of $SiO_2$. As a practical matter, however, use of too dilute solutions leads to extremely dilute product slurries which have the disadvantages of increased processing costs, especially in recovery of the product.

Processing usually is easily accomplished with aqueous product slurries containing 2 to 10 or maybe 15 percent solids by weight. Using partially neutralized sodium silicate containing up to 150 grams per liter $SiO_2$, often 3 to 75 grams per liter $SiO_2$, and controlling the dilution occurring as a consequence of the salt addition (when it is added as an aqueous solution) makes it possible to achieve product slurries of such solid contents.

Moreover, to obtain optimum paper pigments, the salt and the partially neutralized solution of sodium silicate solution are so mixed that the salt is dispersed rapidly throughout the solution. Thus, the siliceous solution may be added to a well agitated liquid body of calcium chloride, the rate of such addition allowing for effective dispersion of the siliceous solution in the calcium chloride solution. Also, ideally suited to accomplishment of preferred mixing of this nature is use of only relatively small volumes. Rapid mixing as well as uniform distribution of the components throughout the medium is best accomplished in this fashion.

These conditions are effectively attained by establishing a moving stream of an aqueous alkali metal silicate solution, adding acid such as hydrochloric acid to the stream at a point along the stream's line of flow and mixing the resulting acidified stream with a salt solution. The respective rates of flow and additions are controlled to establish the desired ratio of reactants. After adding the acid, the resulting stream is agitated or mixed by various expedients. Air or like inert gas may be injected, or a venturi effect created, or both to effect rapid uniform acidification.

The following example illustrates performance of such process:

EXAMPLE I

The apparatus employed in this example is illustrated in FIGURES 1 and 2 of the drawing. It included conduit 1, a sodium silicate feed means provided by a 1½ inch inner diameter pipe. Conduit 1 was joined to conduit 4 (a pipe of ¾ inch inner diameter) at 3 through orifice 5, a circular opening ½ inch in diameter. Conduit 4 included a horizontal run 6 of 4 inches and curved section 7 seven inches long having a 5¼ inch radius of curvature and terminated 16 inches above bottom 10 of tank 9.

Pipes 2 and 8 served as the means for adding acid and compressed air as indicated.

Cylindrical tank 9, comprising cylindrical side wall 11, bottom 10 and top lip 12, was 14 inches high and 15 inches in diameter. Its volume was about 10 gallons. Surrounding the upper portion of tank 9 was collection trough 1 (provided by cylindrical side wall 15 and bottom 14) for collecting liquid overflow from tank 9, such overflow being withdrawn via conduit 16 (a 2 inch inner diameter pipe).

Cylindrical side wall 15 extended 2 inches below top lip 12 of tank 9. Cylindrical walls 15 and 11 were concentric, the diameter of the former being 19 inches, 4 inches greater than the diameter of tank 9.

The stirrer was composed of air driven motor 17, drive shaft 18 and a three blade marine propeller 19. As shown best in FIGURE 2, drive shaft 18 was centrally located in tank 9 along its major vertical axis. Shaft 18 terminated 7 inches above bottom 19 at which point the stirring propellers were located. Individual blades of the propeller were about 3½ inches long and equiangularly (120 degrees apart) disposed around the axis of shaft 18.

Two vertical baffles 20, located in tank 9 as shown in FIGURE 2, were anchored to wall 11 by bands 21. Each baffle was a 10 inch high, 2 inch wide and 1/16 inch thick rectangular prism. Lower edges 22 of baffles 20 were parallel to and spaced one inch above bottom 10. Edges 23 were spaced parallel to and one inch from wall 11.

Conduit 25 (positioned as shown in FIGURE 1 on a side of drive shaft 18 opposite to conduit 7) served as the means for adding salt solution to tank 9. It terminated just at the level of lip 12 of tank 9 and hence, its operation provided for feeding salt to the top surface of the liquid body in tank 9.

Using this apparatus, an aqueous sodium silicate solution at about 25° C. (prepared by mixing 12.5 gallons per minute of water with 9.0 gallons per minute of aqueous sodium silicate containing 25.2 grams of Na$_2$O per liter and about 3.3 moles of SiO$_2$ per mole of Na$_2$O) was fed through conduit 1. At the rate of 0.85 gallon per minute, hydrochloric acid at about 25° C. containing 4.27 moles of HCl per liter was added through pipe 2 to the stream of sodium silicate in conduit 2. At these feeds, the ratio of acid to sodium silicate was equivalent to neutralizing 50 percent of the sodium silicate. Due to the orifice effect and flow of materials, rapid effective mixing of acid and sodium silicate was achieved.

Through conduit 25, 7.6 gallons per minute of an aqueous solution of calcium chloride and sodium chloride at about 25° C. was fed into tank 9. This solution contained 106 grams per liter of CaCl$_2$ and about 40 grams per liter of NaCl.

Compressed air at about 10 pounds per square inch gauge was introduced into the acidified sodium silicate solution in curved portion 7 of conduit 4. This provided for even further mixing.

The temperature of the liquid in tank 9 was 23° C. to 25° C. Air motor 17 was driven at 50 pounds per square inch gauge air pressure and about 900 revolutions per minute.

In the described apparatus, the volume in conduits 1 and 4 between the point of acid addition (at pipe 2) and discharge end of conduit 4 was calculated to be about 200 milliliters. Under these feed rates, the retention time of the acidified sodium silicate in conduits 1 and 4 was about 0.15 second.

As discharged from conduit 4 into tank 9, the partially acidified sodium silicate solution was essentially free of any precipitated siliceous materials. It was visually a water clear solution.

In tank 9 the general flow of liquid is depicted by the arrows in FIGURE 1. Precipitation of siliceous pigment from the solution discharged into tank 9 from conduit 4 occurred in tank 9 upon contact and mixing with the solution of chloride salts added via conduit 25. The rates of addition were such that a total of 30 gallons per minute of liquid were fed to and removed from tank 9. Thus, the average retention time in tank 9 (10 gallon volume) was approximately 20 seconds.

Feeding the materials and using the described apparatus as above described, siliceous pigment was continuously precipitated over an extended period of time in tank 9, the resulting slurry collected via take-off conduit 16.

As removed from tank 9, the slurry pH was about 9. This slurry was continuously pumped at 3 gallons per minute to a 30 gallon acidification tank. Hydrochloric acid was continuously added to maintain the pH at 7.5 in the tank. Overflow from the tank was collected and washed in a two Dorr tank system, a continuous decantation system wherein slurry was pumped at the rate of 3 gallons per minute, mixed with overflow from the second Dorr tank, and fed to the first Dorr tank. The underflow from the second Dorr tank was (6 percent solids by weight) fed to rotary vacuum drum filter. The resulting filter cake (18 to 20 percent solids by weight) was dried in a rotary dryer and then milled in an 18 inch vertical mill.

This product was a white, friable, finely divided flocculated siliceous pigment. Its typical chemical composition was:

|  | Percent by weight |
|---|---|
| SiO$_2$ | 79.5 (79.1–79.9) |
| CaO | 7.2 (6.8–7.5) |
| Fe$_2$O$_3$ | 0.12 |
| R$_2$O$_3$ * | 0.47 (0.36–0.53) |
| NaCl | 0.76 (0.60–0.80) |
| H$_2$O loss on ignition | 12.9 (12.6–13.1) |
| H$_2$O loss at 105° C. | 4.0 (3.6–4.8) |

*Mainly Al$_2$O$_3$ and Fe$_2$O$_3$.

Typical physical properties were:

Surface area (BET) _____ 31 (30–33) square meters per gram.
Flocs below 7 microns ___ 98.2 weight percent.
Predominant ultimate particle size _____ 80–160 millimicrons.

Bracketed figures denote range of variations with different samples prepared during performance of this example.

The paper pigmenting qualities of this product were demonstrated by preparing paper having the pigment dispersed therein and measuring the various properties of such papers. This was done by providing 7 liters of an aqueous pulp slurry containing 2 percent pulp by weight (140 grams of pulp dry basis) beaten to 400 milliliters freeness (Canadian Standard).

A 300 cubic centimeter portion of an aqueous slurry containing 14 grams of the pigment was mixed with the prepared pulp for 5 minutes. Then, sufficient Al$_2$(SO$_4$)$_3$·18H$_2$O was added to adjust the slurry and white water to about pH 5. This pulp was sheeted on a laboratory Noble-Wood sheeting machine and representative sheets of the respective runs were tested to evaluate their ash contents, opacity, brightness, tear and burst factors.

As below reported, percent opacity is the ratio of brightness of a single sheet with a black backing to the brightness of the same sheet with a white backing; tear factor is in grams per gram of 8 inch by 8 inch sheet and burst factor is in pounds per square inch per gram of 8 inch by 8 inch sheet.

The following data is typical of that obtained by a multiplicity of tests on individual samples:

|  | Paper Properties | | | | | |
|---|---|---|---|---|---|---|
|  | Ash, Weight Percent | Opacity, Percent | Brightness, Percent | Tear Factor | Burst Factor | $S_{pir}$ |
| No pigment | 0.3 | 67 | 75 | 28 | 14 | |
| Pigment of Example I | 7.6 | 83.7 | 81.5 | 45 | 6.7 | 0.54 |

EXAMPLE II

A series of runs were performed in which an aqueous sodium silicate [Na$_2$O(SiO$_2$)$_{3.12}$] containing 20 grams per liter Na$_2$O solution and hydrochloric acid were continuously mixed and discharged into the tank described in Example I. Also fed to the tank was an aqueous solution of calicum chloride and sodium chloride (80–90 grams calcium chloride and 35 grams NaCl per liter). The time between acidification and salt addition was about 0.12 second.

The following table lists the various conditions of product preparation, product properties and results of incorporation samples of the pigment paper:

Table I
CONDITIONS OF PRECIPITATION

| Run | Sodium Silicate, grams/liter Na₂O | Mole Excess, CaCl₂/mole Na₂O | Percent Neutralization HCl | Slurry Temperature, °C. | Feed Rates, liter/minute | | | BET Surface Area, m.²/g. | |
|---|---|---|---|---|---|---|---|---|---|
| | | | | | Sodium Silicate | Acid | Chloride | Unaged | Aged [1] |
| 1 | 7.5 | .06 | 50 | 25 | 1.00 | .50 | 1.00 | | 26 |
| 2 | 7.5 | 1.5 | 50 | 25 | 1.00 | .50 | 1.00 | | 24 |
| 3 | 10 | .7 | 50 | 25 | 1.22 | .41 | .81 | | 22 |
| 4 | 10 | .7 | 60 | 25 | 1.05 | .41 | .625 | | 25 |
| 5 | 12.5 | .06 | 50 | 25 | 1.00 | .50 | 1.00 | | 22 |
| 6 | 12.5 | 1.5 | 50 | 25 | 1.00 | .50 | 1.00 | | 28 |
| 7* | 10.7 | .75 | 60 | 25 | 1.00 | .35 | .50 | 51 | 20 |
| 8* | 10.7 | .75 | 64 | 25 | 1.00 | .35 | .50 | 127 | 30 |
| 9* | 10.7 | .75 | 66 | 25 | 1.00 | .35 | .50 | 152 | 34 |
| 10* | 10.7 | .75 | 70 | 25 | 1.00 | .35 | .50 | 292 | 39 |
| 11* | 10.7 | .75 | 73 | 25 | 1.00 | .35 | .50 | 181 | 47 |
| 12* | 9.1 | 1.10 | 80 | 25 | 1.00 | .70 | .50 | 248 | 97 |

[1] Slurry heated for 3 days at 75°C. to 85°C.
* Runs 7 through 12 were conducted by changing the conditions during a long run and obtianing samples at equilibrium.

The following data using the procedure described in Example I was obtained:

Table II

| Pigment from Run No. | Properties of Paper Pigmented with Siliceous Products | | | | | | |
|---|---|---|---|---|---|---|---|
| | Ash Weight, percent | Opacity, percent | Brightness, percent | Tear Factor | Burst Factor | $S_{pig}$ | $S_{paper} \times 10^4$ |
| Control | 0.3 | 67.7 | 74.0 | 30 | 11.7 | | |
| 1 | 7.0 | 83.5 | 83.0 | 37 | 5.9 | 0.52 | 704 |
| 2 | 7.0 | 83.4 | 83.4 | | | 0.54 | 711 |
| 3 | 7.2 | 83.6 | 82.0 | 35 | 7.2 | 0.50 | 699 |
| 4 | 6.8 | 82.7 | 83.3 | | | 0.50 | 685 |
| 5 | 7.0 | 83.4 | 82.7 | 40 | 6.9 | 0.52 | 701 |
| 6 | 7.5 | 83.2 | 83.3 | 41 | 6.6 | 0.49 | 698 |
| 7 | 6.9 | 82.8 | 82.2 | 34 | 6.5 | 0.47 | 675 |
| 8 | 6.6 | 83.1 | 82.6 | 35 | 7.4 | 0.51 | 683 |
| 9 | 6.7 | 83.0 | 82.8 | 38 | 7.2 | 0.50 | 685 |
| 10 | 7.5 | 83.4 | 82.6 | 38 | 7.1 | 0.46 | 695 |
| 11 | 7.4 | 82.7 | 82.7 | 39 | 7.1 | 0.44 | 671 |
| 12 | 8.0 | 80.8 | 81.9 | 40 | 6.3 | 0.33 | 606 |

EXAMPLE IIII

Following the procedure and using the apparatus of Example II, a stream of aqueous sodium silicate (15 grams per liter Na₂O) containing 3.12 moles of SiO₂ per mole of Na₂O at 56.5° C. was continuously acidified with sufficient hydrochloric acid solution of equal volume at 62° C. to react with 60 percent of the sodium silicate and the resulting acidified sodium silicate solution was fed at the rate of 1.0 liter per minute to the tank. An aqueous solution of calicum chloride (26.9 grams per liter) and sodium chloride (10.7 grams per liter) at 64.5° C. was also fed to the tank at the rate of 0.5 liter per minute. The stirrer was run at 1635 revolutions per minute. The slurry in the tank was at 54.5° C. to 56° C. The time elapsing between acidification and addition of chloride salts was 0.13 second.

The slurry was aged overnight at 100° C., filtered, washed and dried. The siliceous pigment was a finely divided, pulverulent, flocculated product having a surface area of 17 square meters per gram and 89.2 percent by weight of its flocs less than 7 microns in size.

Paper was prepared as in Example I having this pigment therein dispersed. Such paper had an ash weight of 6.8 percent, an opacity of 83.5, a brightness of 85.8, a tear factor of 34 and a burst factor of 6.4, and the pigment had an $S_{pig}$ of 0.52.

Besides calcium chloride, other water soluble salts are of use in this process. Most useful are the water soluble metal halides, especially metal chlorides. Typical metal halides include sodium chloride, calcium chloride, barium chloride, strontium chloride, zinc chloride and mixtures thereof. Using a salt such as calcium chloride, the siliceous pigment analytically contains a significant amount of calcium, reported usually as calcium oxide.

It appears besides playing an important role in providing appropriate conditions of precipitation that the calcium chloride reacts with a siliceous component. Not all the alkali metal oxide content of the alkali metal silicate is neutralized with the acid, only 0.3 to 0.7 equivalents of acid per equivalent of alkali metal oxide being used, for example, with an alkali metal silicate having 3.3 moles of SiO₂ per mole of alkali metal oxide. Thus, the percipitated siliceous product contains calcium oxide or like metal oxide, depending upon the salt, in an amount corresponding to the reaction of the salt with the alkali metal silicate in excess of that which will react with the quantity of employed acid. If a mixture of salts is used, it is possible to obtain a siliceous pigment having metal oxides corresponding to the cation of the metal salt.

Although metal chloride salts are preferred, there are other salts. Water soluble metal salts of strong acids (e.g., acids having an ionization constant of at least $1 \times 10^{-2}$) may be suitable. Such salts include the metal nitrates, e.g., calcium nitrate and sodium nitrate; the bromides and iodides such as calcium bromide and sodium iodide; the metal sulfates such as sodium sulfate. Still other salts include sodium aluminate, potassium aluminate and other alkali aluminates. In the main, the effective salts have a cation which would form a water insoluble silicate under the conditions prevailing during precipitation.

The following example illustrates the use of some such salts:

EXAMPLE IV

Following the procedure and using the apparatus of Example II, salts other than the calcium chloride were employed. One liter per minute of sodium silicate solution (20 grams per liter $Na_2O$) was continuously mixed with 0.65 liter per minute of hydrochloric acid containing sufficient acid to neutralize but 50 percent of the $Na_2O$ and the resulting mixture fed at 1.65 liters per minute. The salt solution fed at the rate of 0.67 liter per minute contained 0.58 mole of salt per liter. The elapsed time from acidification to salt addition was about 0.05 second. In the tank, the slurry was at 25° C.

Products were recovered, samples of which were heat aged and analyzed chemically, Table III listing the pertinent data:

*Table III*

| Run No. | Salt | BET Surface Area, m.²/g. | | Composition [1] (Weight Percent) | | | |
|---|---|---|---|---|---|---|---|
| | | Unaged | Aged | Loss on Ignition | RO [2] | $SiO_2$ | Ratio RO to $SiO_2$ |
| 1 | $BaCl_2$ | 26 | 13 | 11.2 | 23.8 | 65.0 | 6.98 |
| 2 | $SrCl_2$ | 97 | 12 | 13.5 | 17.2 | 69.3 | 7.0 |
| 3 | $CaCl_2$ | 147 | 24 | 14.9 | 10.3 | 74.8 | 6.78 |
| 4 | $MgCl_2$ | 506 | 364 | 11.5 | 8.7 | 79.8 | 6.22 |

[1] Age Material.
[2] RO is the metal oxide corresponding to the oxide of the salt.

The following paper data was obtained for the aged products by the procedure described in Example I:

*Table IV*

| Pigment from Run No. | Properties of Paper Pigmented with the Products | | | | |
|---|---|---|---|---|---|
| | Ash, Weight percent | Opacity, percent | Brightness, percent | Tear Factor | Burst Factor |
| 1 | 8.4 | 83.1 | 81.7 | 33 | 5.7 |
| 2 | 6.5 | 82.3 | 82.1 | 33 | 6.0 |
| 3 | 7.2 | 82.7 | 83.2 | 31 | 5.2 |
| 4 | 6.8 | 79.5 | 81.6 | 34 | 5.6 |

Varying amounts of calcium chloride or like salt are employed. Usually employed is at least sufficient calcium chloride or like salt to react with an amount of $Na_2O$ in the sodium silicate which would not be neutralized by the acid. For example, since with a sodium silicate having 3.3 moles of $SiO_2$ per mole of $Na_2O$ but 0.3 to 0.7 equivalents of acid per equivalent of alkali metal oxide of the alkali metal silicate is employed, at least about 0.7 to 0.3 equivalents of calcium chloride per equivalent of alkali metal oxide basis the total amount of alkali metal silicate should be employed. In many instances, an excess of calcium chloride or like salt over and above the amount which would be required to react with this alkali metal oxide content of the alkali metal silicate is useful. To this end, even very large excesses of salts are not detrimental although they may result in added costs. Typically, stoichiometric excess of salt is from 50 to 300 percent.

Any alkali metal silicate such as sodium silicate, potassium silicate, lithium silicate and sodium potassium silicate is suitable. Preference for sodium silicate is due to its availability. Alkali metal silicates containing between 2 and 5 moles of $SiO_2$ per mole of alkali metal oxide are used most frequently. Nevertheless, alkali metal silicates having more than 5 moles of $SiO_2$ per mole of $Na_2O$ may be used.

Water soluble acids, especially those having a hydrogen cation and an anion which forms a water soluble salt with the alkali metal (of the alkali metal silicate) are ideal. Inorganic acids including hydrochloric acid, nitric acid, nitrous acid, sulfuric acid (or $SO_3$), carbonic acid (or $CO_2$), the phosphoric acids, sulfurous acid (or $SO_2$) and the like are contemplated. Also of use are acetic acid, formic acid, the chloroacetic acids and like organic acids. With acids that dissolve slowly in water, it is best to first dissolve them in water and use the solutions in the process.

Acids having anions which form water soluble salts with the cations of the salt present during precipitation offer certain advantages. With carbonic acid and calcium chloride, calcium carbonate may be coprecipitated with the siliceous pigment. It is not easy to separate the carbonate. Presence of calcium carbonate with the siliceous pigment may or may not be desirable.

When choice of acid is premised upon the acid anion forming a water soluble salt, it will be understood salts are water soluble for this purpose if they dissolve in the reaction medium. Slightly water soluble salts, e.g., those having a solubility of at least 2 grams per liter of water (calcium sulfate) are water soluble as herein intended when the reaction medium is adequately dilute to dissolve the amounts in which they are present.

As precipitated, these pigmentary compositions are usually as dilute aqueous slurries containing considerable salt and from 1 to 10 percent (usually 2 to 5 percent) solids by weight. Recovery from this slurry of product in suitable form for commercial shipment and use in pigmenting paper and the like entails separating a substantial portion of the water and salt. Salt and some of the water may be removed by settling and decantation, filtration, centrifugation and the like mechanical separatory practices. One procedure is to use equipment designed to effect decantation, e.g., Dorr tanks. Agents which enhance settling often are added, including quaternary ammonium salts, high molecular weight amines, aluminum salts such as aluminum chloride, and aluminum sulfate. As a rule, the thickened slurry obtained from a 3 percent slurry contains 5 to 8 percent solids by weight. This thickened slurry may be filtered to obtain a wet filter cake, usually containing 15 to 20 or possibly 25 percent solids by weight.

A substantial portion of the remaining water may then be removed by drying through the use of heat to evaporate most of the water. As a general rule, this drying is not performed to remove all of the free water. Thus, typical pigmentary compositions which appear dry and pulverant still contain between 2 and 10 or even 12 percent by weight of free water.

As heretofore indicated, the siliceous pigment as precipitated usually contains an appreciable metal content, measurable as a metal oxide, the metal corresponding to the anion of the salt or salts present during precipitation. Thus, with calcium chloride as the salt, the siliceous pigment contains appreciable calcium oxide.

At least a portion of the calcium oxide (or like metal oxide) content of the precipitated products may be removed, for example, by acidifictaion of the surry, or after heat aging the slurry to stabilize the pigment against large changes in surface area. Usually, heating for at least several hours at 50° C. or higher suffices to effect such stabilization.

Many water soluble acidic materials (inorganic or organic) especially acids which form water soluble salts with the metal of the oxide may be used to reduce this metal oxide content. Typical acids are hydrochloric, phosphoric, sulfuric, sulfurous, nitric, acetic and carbonic or any of their corresponding anhydrides such as $SO_2$, $SO_3$ and $CO_2$. Acidic materials such as acid salts like aluminum sulfate may be used, although they result in replacing metal oxide with a different metal oxide, e.g., $Al_2O_3$.

In many instances, it is advantageous to remove but partially metal oxide such as calcium oxide in this acidification treatment and thus obtain a product having a higher ratio of $SiO_2$ to metal oxide. Calcium oxide sometimes influences favorably pigment retention in paper, a valuable property for a paper pigment. Nevertheless, too great a metal oxide content, especially alkaline oxide, may result in more alkalinity than favored by the paper manufacture. Partial but incomplete removal of metal oxide is accordingly often an advantageous practice. A typical calcium oxide-$SiO_2$ product, after partial calcium oxide removal, may contain 4 to 9 percent CaO by weight of the pigment including normal free and bound water content.

Thus, many of these siliceous pigments contain 6 to 15 moles or up to 25 moles $SiO_2$ per mole of alkaline oxide, notably alkaline earth metal oxide such as CaO.

In many of the exemplary paper pigments, the flocs are not only characterized as already discussed with respect to their size and the ultimate particle size, but appear under high magnification to have their constituent ultimate particles encased by siliceous material. Thus, the flocs (which in appearance may be likened to a grape bunch) give the appearance under high magnification of being encased and filled with siliceous material less dense than the ultimate particles.

These siliceous paper pigments are also further characterizable in terms of their S pigment values, a value calculated from data obtained by actual preparation of pigmented paper and physical properties of the pigment such as index of refraction. Such values indicate the fundamental pigmentary quality of the pigment in paper. By the principles employed to arrive at these S pigment values, variataions in opacity and brightness due to pulp variations and other variants are eliminated. The S pigment values of the exemplary siliceous pigments are above about 0.50, usually in the range of about 0.52 to about 0.56 for ash contents of paper in the range of 6 to 9 percent by weight.

These siliceous pigments are also useful for the purpose of enhancing the optical properties of paper in combination with paper grade titanium dioxide. Thus, in accordance with an embodiment hereof, an eminently effective paper pigment is provided by a composition of these siliceous pigments and titanium dioxide (notably titanium dioxide of 0.2 to 0.3 micron average particle size) usually containing between 30 and 90 percent, ideally 45 to 70 percent, titanium dioxide by weight of the two components. Such compositions exhibit paper pigmenting properties, particularly respecting optical properties, which exceed those attained using the components individually.

This is demonstrated by the following data respecting paper prepared and pigmented in accordance with the procedure described in Example I:

*Table V*

| Pigment Composition, Percent by Weight of | | Properties of Pigmented Paper | | | | | | |
|---|---|---|---|---|---|---|---|---|
| $TiO_2$ | Siliceous [1] | Ash, Weight Percent | Opacity, Percent | Brightness, Percent | Tear Factor | Burst Factor | $S_{pig}$ | $S_{paper} \times 10^4$ |
| 100 | 0 | 8.4 | 87.8 | 84.4 | 31 | 7.7 | 0.76 | 941 |
| 65 | 35 | 8.3 | 88.3 | 85.5 | 31 | 6.4 | 0.78 | 969 |
| 50 | 50 | 7.7 | 88.2 | 84.9 | 34 | 6.5 | 0.78 | 960 |
| 0 | 100 | 7.0 | 83.8 | 83.6 | 36 | 5.8 | 0.53 | 724 |

[1] Siliceous pigments prepared according to the process of Example I.

As these data indicate, compositions of titanium dioxide and the siliceous pigment provide pigmented papers of opacity and brightness values exceeding those attained using the components individually. The $S_{pig}$ and $S_{paper}$ further indicate on a fundamental basis that compositions of both materials are the superior pigments for paper. Moreover, retention of pigment in the paper improves considerably.

The floc sizes herein mentioned are determined by a specific procedure, which although not necessarily providing an absolute measurement, does establish a scientifically significant, readily determinable standard. The procedure involves warming an aqueous pyrophosphate solution containing 0.05 percent pyrophosphate by weight to 30° C. in a water bath. This solution is prepared by neutralizing distilled water to a pH of 7 with sodium hydroxide and dissolving 0.84 gram of tetrasodium pyrophosphate decahydrate in each liter of neutral water. To approximately 250 cubic centimeters of this heated solution is added 2.50 grams of silica and the resulting mixture is treated in a Waring Blendor for exactly 15 seconds, whereafter the slurry is transferred to a 250 milliliter graduated, stoppered cylinder and mixed thoroughly by inverting the cylinder. The level is adjusted to the 250 milliliter mark before mixing.

After mixing, the cylinder is placed in the upright position and a timer started. Immediately, a 5 milliliter pipette so fitted with a rubber stopper that it will reach exactly 2.2 centimeters below the 245 milliliter mark of the cylinder is inserted and a 5 milliliter slurry sample is withdrawn into a tared weighing bottle. After 49 minutes, a second sample is withdrawn into a tared weighing bottle and the respective samples are dried at 105° C. in an oven overnight.

The ratio times one hundred of the weight of the second sample divided by the weight of the first sample is the percent of flocs less than 7 microns in diameter.

As reported and used herein, the terms "BET surface area" or "surface area" refer to the surface area of the siliceous pigment as measured by the Brunauer-Emmett-Teller method described in the Journal of the American Chemical Society, volume 60, page 30 (1938).

Also the S pigment and S paper values are those based upon pigmented papers having ash contents of 6 to 9 percent by weight.

By "siliceous pigment" as used herein is meant a material having on an anhydrous basis at least 50 percent by weight $SiO_2$. Most of these siliceous pigments contain at least 75 percent and up to 95 percent or even more $SiO_2$ by weight on an anhydrous basis.

Besides being valuable for dispersion in paper, these siliceous pigments are useful for other purposes. They are useful for surface coating paper, cardboard, etc. Thus, coating compositions of an external size such as starch may advantageously include such siliceous pigment. These siliceous pigments are also useful as inert diluents for various agricultural materials such as DDT or benzene hexachloride, especially in providing finely divided, solid compositions such as dusts of such agricultural chemicals. They also may be incorporated in natural and synthetic rubbers, as vinyl polymers and other synthetic resins reinforcers or fillers.

This application is a continuation-in-part of application Serial No. 700,747, filed December 5, 1957, and now abondoned.

While the present invention has been described by reference to specific details of certain embodiments, it is not intended that the invention be construed as limited to such details except insofar as they appear in the appended claims.

I claim:
1. A method of preparing finely divided siliceous pigment which comprises partially neutralizing alkali metal silicate with an acidifying agent to provide an aqueous siliceous solution having a tendency itself to precipitate siliceous material and precipitating siliceous pigment from the solution by mixing water soluble inorganic salt and the solution subsequent to its formation by said partial neutralization but before consequential precipitation occurs in the solution due to said tendency.

2. A method of preparing finely divided siliceous pigment which comprises mixing in aqueous medium an acid with aqueous alkali metal silicate having 3.0 to 3.6 moles of $SiO_2$ per mole of alkali metal oxide in the ratio of 0.3 to 0.7 equivalents of acid per equivalent of alkali metal oxide of the silicate and forming a partially neutralized alkali metal silicate solution, said solution having a tendency to form siliceous precipitate, and precipitating siliceous pigment by adding inorganic water soluble metal salt to the partially neutralized solution subsequent to said mixing but before consequential precipitation occurs in the solution due to said tendency.

3. A method of preparing finely divided siliceous pigment which comprises mixing in aqueous medium an acid with aqueous alkali metal silicate having 3.0 to 3.6 moles of $SiO_2$ per mole of alkali metal oxide in the ratio of 0.3 to 0.7 equivalents of acid per equivalent of alkali metal oxide of the silicate and forming a partially neutralized alkali metal silicate solution, said solution having a tendency to form siliceous precipitate, and adding inorganic water soluble metal salt to the partially neutralized solution subsequent to but within less than one minute of said mixing and formation of partially neutralized solution to precipitate siliceous pigment.

4. A method of preparing finely divided siliceous pigment which comprises mixing in aqueous medium hydrochloric acid with aqueous sodium silicate having 3.0 to 3.6 moles of $SiO_2$ per mole of $Na_2O$ in the ratio of 0.3 to 0.7 equivalents of acid per equivalent of sodium oxide of the silicate and forming a partially neutralized alkali metal silicate solution, said solution having a tendency to form siliceous precipitate, and adding inorganic water soluble metal salt to the partially neutralized solution subsequent to but within less than one minute of said mixing and formation of partially neutralized solution to precipitate siliceous pigment.

5. The method of claim 4 wherein the salt is an alkaline earth metal salt.

6. The method of claim 4 wherein the salt is calcium chloride.

7. A method of preparing finely divided siliceous pigment which comprises mixing in aqueous medium hydrochloric acid with aqueous soduim silicate having 3.0 to 3.6 moles of $SiO_2$ per mole of $Na_2O$ in the ratio of 0.3 to 0.7 equivalents of acid per equivalent of sodium oxide of the silicate and forming a partially neutralized alkali metal silicate solution, said solution having a tendency to form siliceous precipitate, and adding inorganic water soluble metal salt to the partially neutralized solution subsequent to but within less than five seconds of said mixing and formation of partially neutralized solution to precipitate siliceous pigment.

8. A method of preparing finely divided siliceous pigment which comprises establishing a moving stream of aqueous alkali metal silicate, adding sufficient acid to said stream along its path of flow to neutralize partially the alkali metal silicate and provide a moving stream of partially neutralized solution of alkali metal silicate having a tendency to form siliceous precipitate, and subsequent to adding acid but before formation of consequential siliceous precipitate due to said tendency in said partially neutralized solution mixing water soluble inorganic metal salt and the moving stream to precipitate siliceous pigment.

9. A method of preparing finely divided siliceous pigment which comprises establishing a moving stream of aqueous alkali metal silicate, adding sufficient acid to said stream along its path of flow to neutralize partially the alkali metal silicate and provide a moving stream of partially neutralized solution of alkali metal silicate having a tendency to form siliceous precipitate, within one minute after adding acid but before formation of consequential siliceous precipitate due to said tendency in said partially neutralized solution mixing inorganic water soluble metal salt and the moving stream to precipitate siliceous pigment.

10. A method of preparing finely divided siliceous pigment which comprises providing a moving stream of aqueous alkali metal silicate, said silicate having 3.0 to 3.6 moles of $SiO_2$ per mole of alkali metal oxide, mixing acid with the stream along its path of flow to neutralize partially the alkali metal silicate and provide a moving stream of partially neutralized alkali metal silicate having a tendency to form siliceous precipitate, the amount of acid being 0.3 to 0.7 equivalents per equivalent of alkali metal oxide of the silicate, and within one minute after forming the partially neutralized alkali metal silicate but before formation of precipitate due to said tendency mixing inorganic water soluble alkaline earth metal salt and the partially neutralized stream to precipitate siliceous pigment.

11. A method of preparing finely divided siliceous pigment which comprises providing a moving stream of aqueous alkali metal silicate, said silicate having 3.0 to 3.6 moles of $SiO_2$ per mole of alkali metal oxide, mixing acid with the stream along its path of flow to neutralize partially the alkali metal silicate and provide a moving stream of partially neutralized alkali metal silicate having a tendency to form siliceous precipitate, the amount of acid being 0.3 to 0.7 equivalents per equivalent of alkali metal oxide of the silicate, within five seconds after forming the partially neutralized alkali metal silicate but before formation of consequential precipitate due to such tendency mixing water soluble alkaline earth metal salt and the partially neutralized stream to precipitate siliceous pigment.

12. A method of preparing finely divided siliceous pigment which comprises providing a moving stream of aqueous sodium silicate containing 3.0 to 3.6 moles of $SiO_2$ per mole of $Na_2O$, mixing hydrochloric acid with the stream along its path of flow to neutralize partially the sodium silicate and provide a moving stream of partially neutralized sodium silicate, having a tendency to form siliceous precipitate, the amount of acid being 0.3 to 0.7 equivalents per equivalent of sodium oxide of the silicate, within one minute after forming the partially neutralized sodium silicate stream but before formation of precipitate mixing alkaline earth metal halide with the partially neutralized stream to precipitate siliceous pigment.

13. A method of preparing finely divided siliceous pigment which comprises establishing a moving stream of aqueous alkali metal silicate, adding acid to said stream along its path of flow to neutralize partially the alkali metal silicate and provide a moving stream of a partially neutralized solution of alkali metal silicate having a tendency to form siliceous precipitate and subsequent to but within five seconds of adding acid and forming the partially neutralized solution of alkali metal silicate but before formation of consequential siliceous precipitate due to said tendency in said partially neutralized solution mixing water soluble inorganic salt in the moving stream to precipitate siliceous pigment.

References Cited in the file of this patent

UNITED STATES PATENTS

| | | |
|---|---|---|
| 2,000,031 | Larson | May 7, 1935 |
| 2,378,193 | Cummins et al. | June 12, 1945 |
| 2,679,463 | Alexander et al. | May 25, 1954 |
| 2,805,956 | Pechukas | Sept. 10, 1957 |
| 2,943,970 | Allen | July 5, 1960 |
| 2,943,971 | Taylor | July 5, 1960 |

OTHER REFERENCES

Crawford: Pulp and Paper Magazine of Canada, Convention Issue, 1936, pages 97–101.